June 5, 1951
C. S. McCARTHY
2,555,804
ADJUSTABLE SEAT SUPPORT
Filed April 22, 1946
3 Sheets-Sheet 1
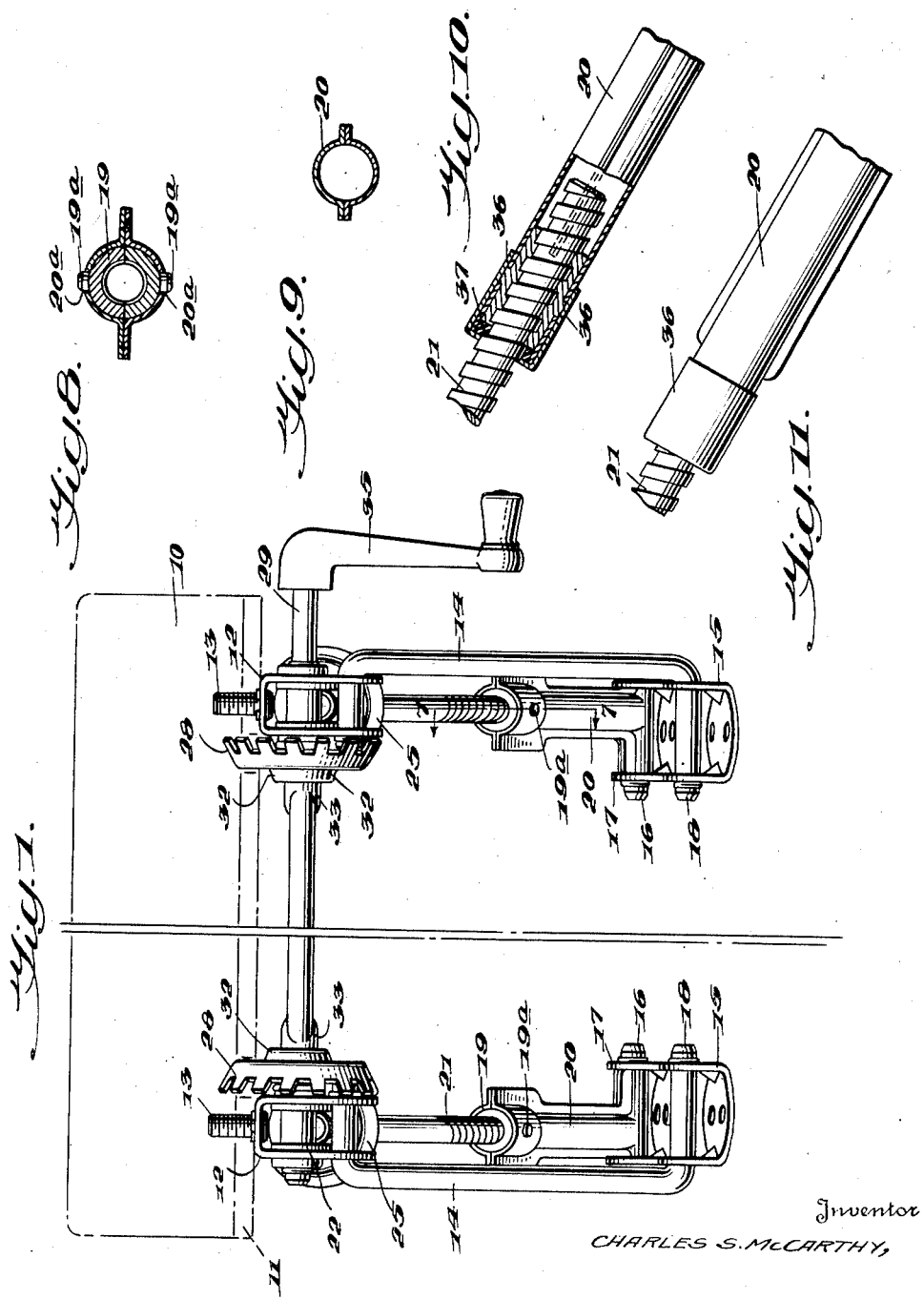
Inventor
CHARLES S. McCARTHY,
By George Rex Frye.
Attorney

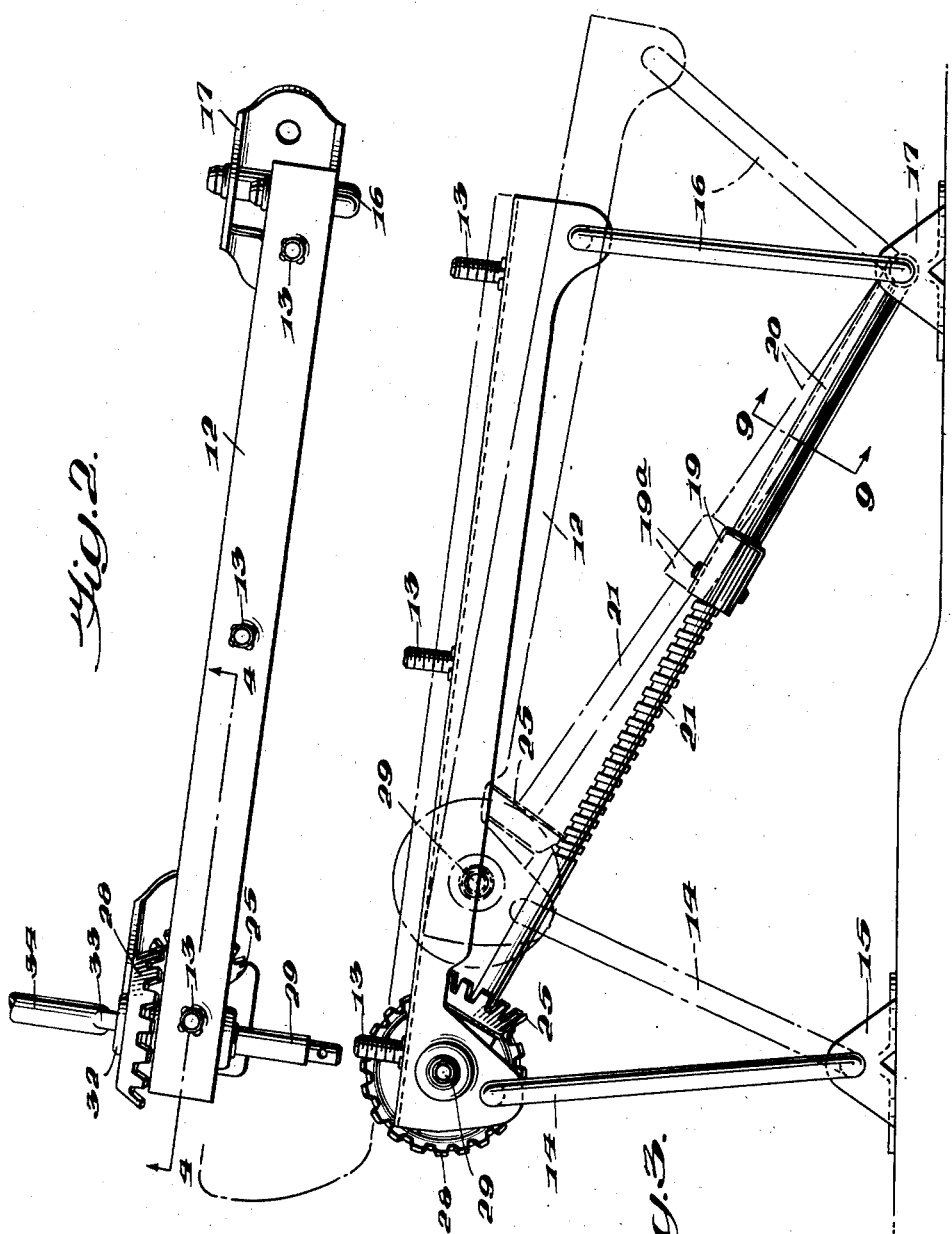

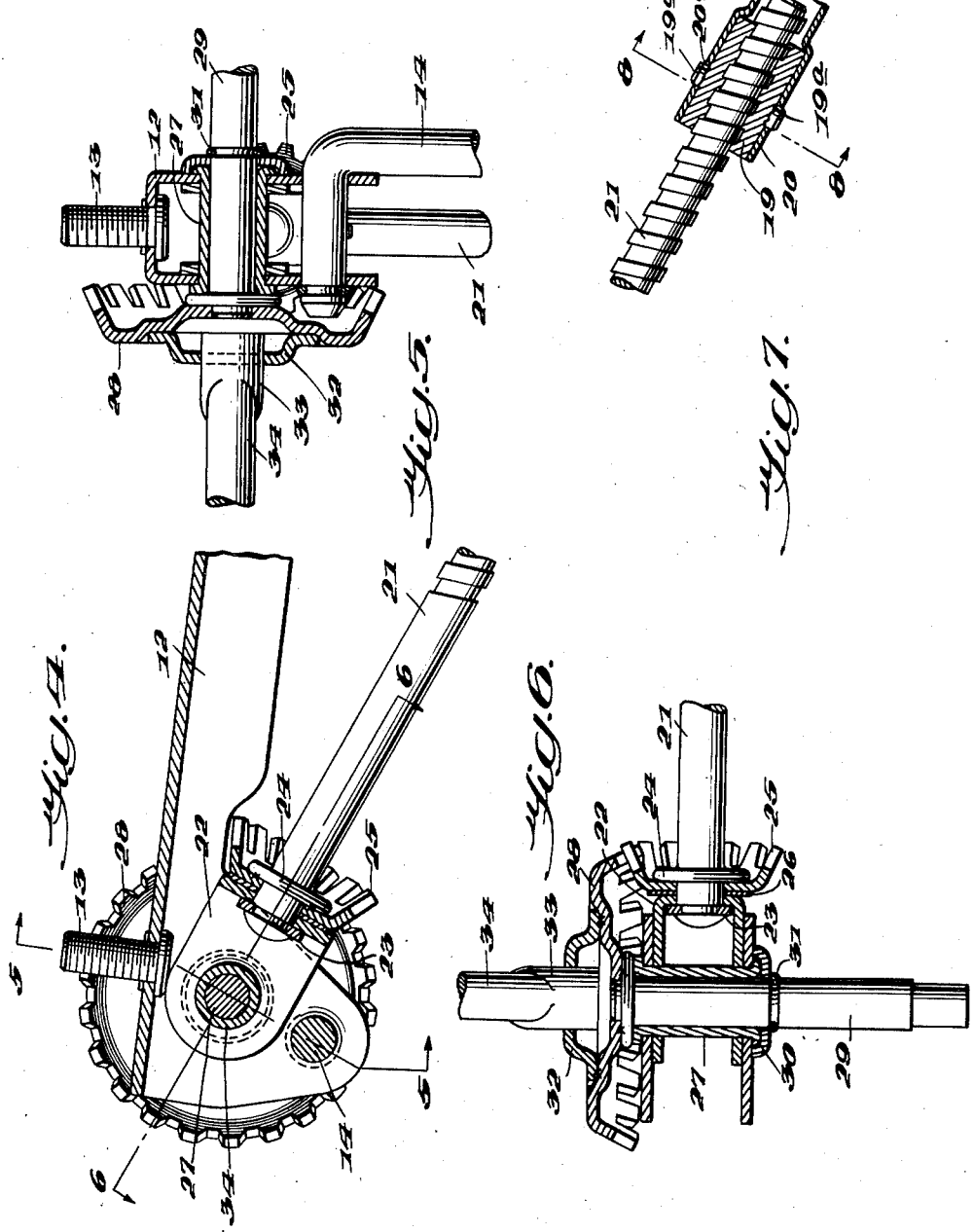

Patented June 5, 1951

2,555,804

UNITED STATES PATENT OFFICE 2,555,804

ADJUSTABLE SEAT SUPPORT

Charles S. McCarthy, Birmingham, Mich., assignor to American Forging and Socket Company, Pontiac, Mich., a corporation of Michigan Application April 22, 1946, Serial No. 663,841

10 Claims. (Cl. 155—91)

This invention relates to adjustable seat supporting structure, particularly for vehicle seats, whereby simultaneous adjustment of the longitudinal position and height of the seat may readily be made.

A primary object of this invention is the provision of simplified seat supporting structure, actuated by a handle to effect the adjustment of the seat in the desired direction, and which is self-locking to hold the seat in the adjusted positions when the handle is at rest.

Another important object of this invention is the arrangement of vehicle seat supporting and adjusting structure by means of which the seat can be adjusted by moving the handle, with or without the weight of a passenger thereon, so that the seat can be adjusted and locked in desired position by a person standing outside of the vehicle, simply by turning the handle to the desired extent.

A further object of this invention is the provision of seat adjusting structure, adapted for preliminary assembly and ready installation as a unit, for raising and lowering a vehicle seat and simultaneously moving the seat forwardly or rearwardly as desired.

A further object of this invention is the mounting of a wide vehicle seat so that adjustment is effected without danger of either end or side of the seat wedging or sticking during the adjusting operation, even when a single passenger is seated adjacent one end of the seat.

Other objects and advantages will be apparent from the following description taken in connection with the accompanying drawings showing a preferred embodiment of the invention by way of example, many variations in structure being possible.

In the drawings:

Fig. 1 is a front view of my improved seat adjuster attached to a vehicle seat and floor;

Fig. 2 is a plan view, and Fig. 3 is a side elevation of one of the self-locking adjuster members;

Fig. 4 is a detail vertical section taken substantially on the line 4—4 of Fig. 2;

Figs. 5 and 6 are detail cross sections taken substantially on the lines 5—5 and 6—6 of Fig. 4;

Fig. 7 is a detail vertical section, and Figs. 8 and 9 are cross sections taken respectively on the lines 7—7, 8—8 and 9—9;

Fig. 10 is a detail sectional view similar to Fig. 7, and Fig. 11 is a plan view showing a modified securing means for the nut.

Referring now to the drawings, the reference numeral 10 designates a vehicle seat of conventional type, the bottom 11 of which is secured to a pair of channel members 12, as by bolts 13. Channel members 12 extend from front to rear of the seat 10 adjacent the ends or sides of such seat, and form the upper portions of my improved seat adjuster structure. Front links 14 connect the forward ends of channel members 12 to floor brackets 15 and rear links 16 connect the rear extremities of such channel members 12 to floor brackets 17, as best shown in Figs. 1 and 3. As herein shown, links 14 and 16 are formed of round stock with right-angled bends at their extremities, the upper bent portions passing through apertures in the walls of channel members 12 and the lower bent portions passing through apertures in spaced upstanding walls in floor brackets 15 and 17. To prevent accidental withdrawal of the bent portions of the links from the channel or bracket walls snap-rings 18 are provided, seating in annular grooves adjacent the respective ends of the links. Front links 14 are shown as longer than rear links 16 and front floor brackets 15 are mounted in a horizontal plane above that in which rear floor brackets 17 are mounted. (Fig. 3.)

It will be noted that as the seat moves forward or backward, links 14 and 16 will pivot in both the channel members 12 and the floor brackets. In the preferred arrangement shown, this will result in lifting the seat as it is moved forward and also in slightly changing the angle of the seat bottom relatively to a horizontal plane to better support the back of a short person. Obviously, by changing the arc of travel of the seat in a vertical plane, different results may be obtained, and the seat raised, lowered, or rocked to meet desired objectives of the vehicle designer.

The self-locking means for adjusting the position of the seat whenever desired will now be described. A plurality of self-locking adjuster members are arranged diagonally between the seat and the floor and positioned between the above-mentioned links. As shown, one is mounted adjacent each end of the seat. Each adjuster member comprises a nut 19 mounted in one extremity of and held against rotation by a retaining member 20, the other extremity of which is pivotally connected to members anchored to the floor below the rear edge of the seat, and an elongated screw member, or threaded shaft, 21, the threaded extremity of which interfits with and passes through nut 19 and the other extremity of which is pivotally connected to members anchored to the seat adjacent its front edge. Nut 19 may have any desired contour and thread arrangement desired. In the illustrated embodiment, nut 19 is formed of upper and lower halves, each of which has a projection 19ᵃ on its centerline extending outwardly from its perimeter to enter an opening 20ᵃ pierced in retaining member 20. Such nut sections may readily be molded of powdered metal and oil impregnated to withstand extended use in varied climates.

Nut retaining member 20 is herein shown as a tubular stamping made in one piece by providing a central flat portion spacing end portions formed as semi-cylinders with flat webs at their side edges, and then folding so that the flat central portion becomes a strap hinge section adapted to encircle the lower bent portion of link 16 and the two semi-cylinders come together to form a tube. After the nut halves have been inserted with their projections 19ᵃ fitting through openings 20ᵃ, the flat webs on member 20 are spot-welded or otherwise suitably secured to each other, particularly adjacent the nut 19 and adjacent the strap hinge section. (Fig. 1.)

The elongated screw member 21 threads into and through nut 19 (Fig. 7) and at its other extremity is shown as passing through the central portion of a U-shaped bracket 22 and a washer 23 arranged within the bracket, the end of the shaft of member 21 being riveted over such washer to prevent withdrawal. (Fig. 4.) Exteriorly of bracket 22 the shaft of screw member 21 is shown with a struck-up flange or collar 24 to which a bevel gear 25 is welded or otherwise suitably secured. Between the bracket 22 and bevel gear 25 there is mounted a brass washer 26 for anti-friction purposes.

U-shaped bracket 22 is pivotally mounted within channel member 12, its apertured leg portions surrounding a hollow bushing 27. The ends of bushing 27 pass through apertures in the walls of the channel member and then are curled outwardly exteriorly of the channel walls to prevent withdrawal.

Bevel gear 28 meshes with bevel gear 25, and, as herein shown, is spot-welded to the struck-up end portion of stub-shaft 29 (Fig. 6), which shaft is journalled in bushing 27. A washer 30 encircling shaft 29 exteriorly of the bushing is retained against longitudinal movement on the shaft 29 by means of a snap ring 31 seated in an annular groove on the shaft. To the side of bevel gear 28 remote from the bushing is welded a dished plate 32 centrally pierced with a slot for the reception of the flattened end 33 of tie-bar 34, by means of which rotation of one stub-shaft 29 will be transmitted to the stub-shaft of the companion adjuster member, enabling simultaneous turning of the rotary parts of both adjuster members. As shown in Fig. 1, both ends of tie-bar 34 are similarly flattened, and by selecting tie-bars of appropriate length standard adjuster members may be taken from stock and utilized with seats of different widths in various vehicles. A handle 35 is pinned, or otherwise suitably secured, to one of the stub-shafts 29 of the pair of adjuster members used with each seat. With automobile seats in America, such handle would customarily be carried by the adjuster member at the left, projecting beyond the left-hand edge of the seat, substantially as shown in Fig. 1. This arrangement permits convenient adjustment of the seat by the driver, either before or after entering the vehicle.

The threads on screw members 21 have a helix angle sufficient to prevent rotation of the screw members because of pressure exerted thereon. Wherever the operator stops the adjustment (by ceasing rotation of handle 35) the seat will be securely locked, slippage or creeping being prevented by the self-locking adjuster members. In the illustrated embodiment, the bevel gears 28 of the pair of adjuster members face in opposite directions, and accordingly one of the screw members 21 is provided with a left-hand thread and the other with a right-hand thread. Rotation of handle 35 in a counter-clockwise direction will lengthen both adjuster members, and so advance the seat forwardly and upwardly in the illustrated embodiment. Rotation of handle 35 in a clockwise direction will reverse the motion, shortening the adjuster members by drawing more of the screw members 21 through nut 19 and into tubular members 20. As shown by dotted lines in Fig. 3, retraction of the seat in a rearward direction will be accompanied by lowering of the seat and change in the angle formed by the seat to a horizontal plane.

In Figs. 10 and 11 is shown a modified form of securing nut 19 in the end of nut-holding member 20. A ferrule-like ring 36 is pressed over the end of holding member 20 around the upper portion of nut 19, the webs on member 20 being shortened to the extent required. A washer 37 of rubber, fibre, or the like is also held in place by ferrule 36 and serves to wipe the threads of the interfitting threaded shaft member 21.

It will be apparent that minute changes in adjustment are permitted throughout the entire range, suggested by the full and dotted line positions in Fig. 3. Rotation of the bevel gears whenever handle 35 is turned effects any desired fractional revolution of the shafts 21 to bring the seat to the exact location fitting the driver. Obviously the bevel gears 28 and 25 may be made with any desired number of teeth. The illustrated embodiment shows a ratio of approximately two to one, but this is merely for exemplification. As illustrated, both bevel gears 25 and 28 are stamped from sheet metal with their web portions shaped to strengthen the gears, and to lend such web portions to easy welding upon the struck-up collars on threaded shafts 21 and stub shafts 29. No load is carried by the adjuster-members, except when actually adjusting the position of the seat. The necessity for anti-friction means incidental to most of the prior seat adjuster mechanism is eliminated, and a much freer working adjuster has been attained. In addition the present adjuster mechanism does away with the use of tracks and ratchet members common to prior seat adjusters, and it is no longer necessary for the driver to push against the floor-board with his legs to move the seat rearwardly for adjustment.

While I have illustrated and described what I now regard as a practical and efficient construction for the embodiment of the proposed improvements, it is to be understood that the form of construction shown is to be deemed merely illustrative and as susceptible of various changes or modifications within the spirit and scope of my invention, as defined in the appended claims.

I claim:

1. In combination with a seat, a seat adjuster mechanism for adjusting the position of the seat relatively to a floor comprising a pair of links adjacent each end of the seat pivotally connected at their extremities to the seat and the floor, a pair of longitudinally extensible self-locking adjuster members arranged diagonally between the seat and the floor, one adjacent each end of the seat and pivotally connected at their extremities to the seat and floor, and means for simultaneously varying the length of said adjuster members, comprising a bevel gear fixed on each adjuster member, a handle mounted for rotation at one side of said seat, and a pair of bevel gears turnable with said handle and respectively meshing with the bevel gears on said adjuster members.

2. Seat adjuster mechanism comprising a pair of channel members adapted to be secured to the bottom of a seat adjacent the ends thereof, a pair of spaced brackets adapted to be secured to a floor below each channel member, a pair of links pivotally connecting each channel member with said floor brackets, and means for simultaneously swinging said channel members forwardly or rearwardly including substantially U-shaped brackets pivotally mounted upon said channel members, elongated threaded shafts journalled at their upper extremities in said last-mentioned brackets, nuts threaded upon said shafts, members pivoted at their lower extremities upon two of said floor brackets and holding said nuts against rotation, bevel gears fixed on said threaded shafts adjacent their upper extremities, and means for simultaneously rotating said bevel gears.

3. Seat adjuster mechanism comprising a pair of channel members adapted to be secured to the bottom of a seat adjacent the ends thereof, a pair of spaced brackets adapted to be secured to a floor below each channel member, a pair of links pivotally connecting each channel member with said floor brackets, and means for simultaneously swinging said channel members forwardly or rearwardly including brackets pivotally mounted upon said channel members, elongated threaded shafts journalled at their upper extremities in said last-mentioned brackets, nuts threaded upon said shafts, members pivoted at their lower extremities upon two of said floor brackets and holding said nuts against rotation, bevel gears fixed on said threaded shafts, and means for simultaneously rotating said bevel gears, including a handle journalled in one of said channel members, bevel gears journalled in said channel members and meshing with said bevel gears on the threaded shafts, and means for simultaneously turning said bevel gears when said handle is turned.

4. Seat adjuster mechanism comprising a pair of channel members adapted to be secured to the bottom of a seat adjacent the ends thereof, a pair of spaced brackets adapted to be secured to a floor below each channel member, a pair of links pivotally connecting each channel member with said floor brackets, and means for simultaneously swinging said channel members forwardly or rearwardly including brackets pivotally mounted upon said channel members, elongated threaded shafts journalled at their upper extremities in said last-mentioned brackets, nuts threaded upon said shafts, members pivoted at their lower extremities upon two of said floor brackets and holding said nuts against rotation, bevel gears fixed on said threaded shafts, and means for simultaneously rotating said bevel gears, including stub shafts journalled in said channel members, bevel gears fixed upon said stub shafts and respectively meshing with said bevel gears on the threaded shafts, a handle fixed upon one of said stub shafts, and a connector rod arranged between the bevel gears on said stub shafts to impart simultaneous rotation thereto when said handle is rotated.

5. Seat adjuster mechanism as recited in claim 2 wherein each nut-holding member is pivotally mounted in the same floor bracket in which one of said links is pivoted.

6. Seat adjuster mechanism as recited in claim 2 wherein said floor brackets at each end of the seat are secured at different horizontal levels, and said links at each end of the seat are of different lengths.

7. Seat adjuster mechanism as recited in claim 2 wherein said floor brackets are arranged below the front and rear of the seat at each end thereof, and said links connecting the front floor brackets with the channel members are of greater length than the links connecting the rear floor brackets with the channel members.

8. Seat adjuster mechanism as recited in claim 4 wherein said bevel gears on said stub shafts face in opposite directions and said threaded shafts are formed one with a right hand thread and one with a left hand thread.

9. Seat adjuster mechanism as recited in claim 4 wherein a hollow bushing it mounted in each channel member, said stub shafts being journalled in said bushing and said pivoted brackets being mounted on said bushing.

10. Seat adjuster mechanism as recited in claim 2 wherein said nuts are formed of half-sections carrying projections on their perimeters, and said nut holding members are provided with openings receiving said projections.

CHARLES S. McCARTHY.

REFERENCES CITED

The following references are of record in the file of this patent:

UNITED STATES PATENTS

| Number | Name | Date |
| --- | --- | --- |
| 600,018 | Pace | Mar. 1, 1898 |
| 757,807 | Hazard | Apr. 19, 1904 |
| 2,345,182 | Corber | Mar. 28, 1944 |
| 2,351,283 | Orton | June 13, 1944 |

FOREIGN PATENTS

| Number | Country | Date |
| --- | --- | --- |
| 505,703 | Great Britain | May 16, 1939 |
| 560,404 | Great Britain | Apr. 3, 1944 |